Dec. 20, 1955     J. T. KANEMOTO     2,727,789
ADJUSTABLE TRACTOR WHEEL
Filed Nov. 27, 1953
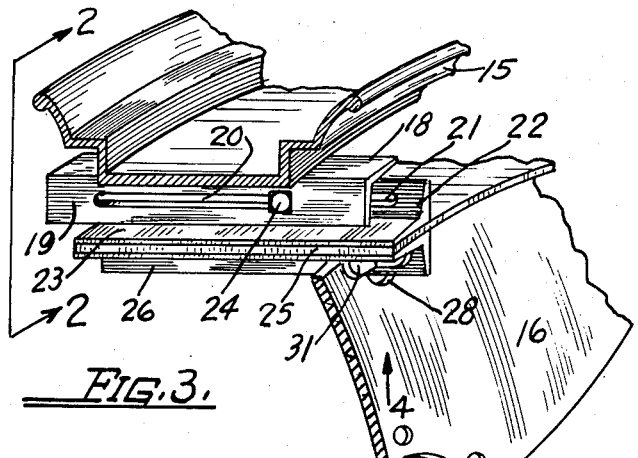
FIG. 3.
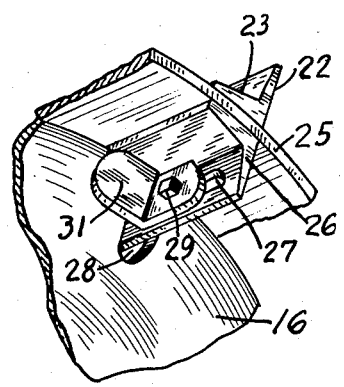
FIG. 4.
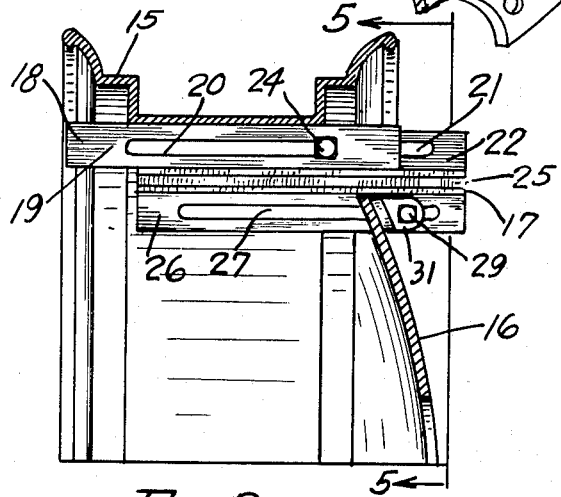
FIG. 2.
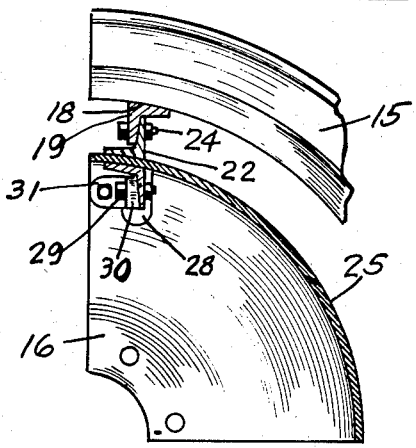
FIG. 5.
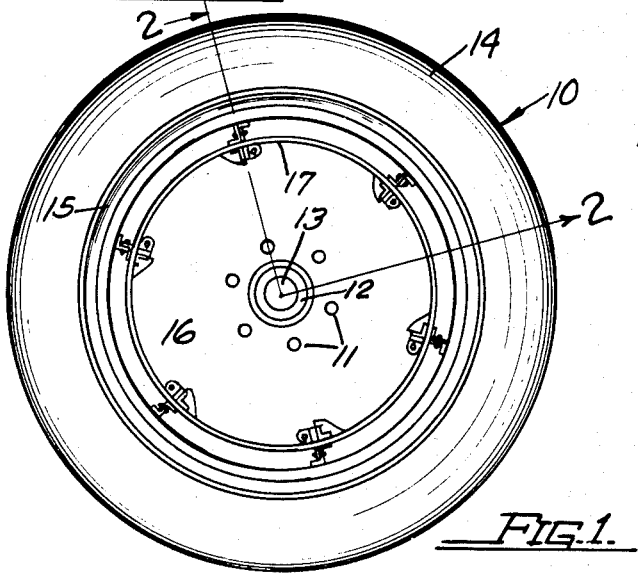
FIG. 1.
FIG. 6.
INVENTOR.
Jimmie T Kanemoto
BY
ATTORNEYS

United States Patent Office 2,727,789
Patented Dec. 20, 1955

2,727,789

ADJUSTABLE TRACTOR WHEEL

Jimmie T. Kanemoto, Longmont, Colo.

Application November 27, 1953, Serial No. 394,692

3 Claims. (Cl. 301—9)

This invention relates to adjustable tractor wheel assemblies and more particularly to means for accomplishing relative adjustment of the tire of a tractor wheel assembly with respect to the wheel to change the distance between the wheels.

Farm tractors are usually provided with a way of increasing or decreasing the distance separating the rear wheels because the space between adjacent furrows in a plowed field and between rows of plants varies widely and for effective use of the tractor each of the rear wheels must travel in a furrow. Some tractors are equipped with a splined rear axle extending outwardly from the bearings sufficiently far to permit positioning of the wheel hub at various points and thereby varying the distance between the wheels. One of the disadvantages of this arrangement is that the axle must be quite large in order to withstand the additional stress caused by the wheel hub being out toward the end of the axle and away from the bearing. Another method of accomplishing the same purpose is to provide dished wheels that can be attached to the tractor with the concave surface in or out depending on the spacing desired. Of course, the above arrangement involves a complete removal of one or both rear wheels when the spacing is changed and only three spacings are possible, i. e. both concave surfaces facing outwardly, both concave surfaces inwardly and one concave surface in and one out.

Among the objects of the present invention are to provide an adjustable tractor wheel assembly which will eliminate the aforementioned difficulties by providing a wheel assembly in which the rim and tire unit may be adjusted relative to the wheel while the hub remains positioned close to the bearing and in which such adjustment may be made without removing the wheel from the axle. Further objects of the invention disclosed herein are to provide a wheel assembly in which the tire rim and tire can be adjusted relative to the wheel over a considerable distance and wherein said rim and tire may be positioned at any point intermediate of the adjustment limits.

Having thus described the objects of the invention, the invention itself will now be described in detail, for which purpose reference will be had to the accompanying drawing in which the invention has been illustrated, and in which:

Figure 1 is a side elevation of a rear tractor wheel assembly, hub and axle, showing the wheel and tire rim separated by, but connected to, an adjustable rim by L-shaped brackets and angle irons which will be described in detail herein.

Figure 2 is a quarter section of the tractor wheel assembly and adjustable rim showing one set of the angle irons and L-shaped brackets taken along lines 2—2 of Figures 1 and 3.

Figure 3 is a perspective view, partly in section, similar to Figure 2, as it would be seen from a point upward and to the right of Figure 2.

Figure 4 is a detailed view of the L-shaped bracket to better show its construction as seen along the direction of the arrow 4 in Figure 3.

Figure 5 is a quarter section of the tractor wheel assembly and adjustable rim taken along line 5—5 of Figure 2.

Figure 6 is a sectional view of a portion of a tractor wheel assembly showing the tire rim attached directly to the wheel by means of an angle iron and an L-shaped bracket.

Referring now to Figure 1 of the drawing in which is shown a rear tractor wheel assembly designated in its entirety by numeral 10 secured by bolts 11 to the hub 12 which is non-rotatably mounted upon axle 13. Tire 14 is mounted in the conventional manner upon tire rim 15. The tire rim is secured to the wheel 16 by means of an adjustable rim assembly designated numeral 17, the construction of which will be described in detail in connection with the remaining figures of the drawing.

Figures 2, 3 and 5 show the tire rim with a short tire rim angle iron 18, one of which is shown in spaced angular relation around the inside of the rim. This angle is welded or otherwise permanently attached to the rim along one side flange, the remaining downwardly extending flange 19 contains a slot 20 that extends longitudinally. Registering with slot 20 is a like slot 21 in the upwardly extending flange 22 of outer angle iron 23 which is a part of the adjustable rim assembly 17. The parallel faces or flanges 19 and 22 are joined together by bolt 24 passing through slots 20 and 21, thus permitting the tire rim angle iron and the outer angle iron to be adjusted relative to each other. The remaining flange of the outer angle iron is welded or otherwise attached in spaced angular relation, corresponding to the tire rim angle irons, around the outside of adjustable rim 25. Inner angle iron 26 is permanently secured to the inside of the adjustable rim in spaced angular relation corresponding to the tire rim angle iron and the outer angle iron. The downwardly extending flange of the inner angle iron is provided with a longitudinal slot 27, parallel to slots 20 and 21. The inner angle iron is positioned in notch 28 in wheel 16 and secured to said wheel by means of bolts 29 extending through slot 27 and hole 30 in L-shaped bracket 31 that is welded to the wheel alongside the notch with one side parallel to the downwardly extending side of the inner angle iron as shown most clearly in Figure 4. The tractor wheel assembly is shown as provided with six sets of angle irons and L-shaped brackets, all of which are identical. Figures 2, 3, 4 and 5 show only one set for this reason. Any number of angularly spaced sets of angle irons and L-shaped brackets more than two may be used.

Figure 6 shows a modification of the aforementioned adjusting means in which the tire rim is attached directly to the wheel by means of the bolt 29 passing through the opening in the L-shaped bracket and the slot 20 in downwardly extending flange 17 of tire rim angle iron 18. By eliminating the adjustable rim and inner and outer angle irons attached thereto, it is possible to adjust the tire rim relative to the wheel by a distance approximating the length of slot 20.

When it is necessary to change the distance between the rear wheels of a tractor, the rear end is raised until the wheels are free from the ground after which the adjustment may be accomplished in the following manner with the above described invention. Small adjustments are taken care of by loosening bolts 29 on the L-shaped brackets and moving the tire rim and adjustable rim assembly as a unit, outward or inward as desired, relative to the wheel and retightening the bolts. Still greater adjustment may be had by also loosening bolts 24 which permit relative movement of the tire rim and the adjustable rim. If slots 20, 21 and 27 are all the same length it is possible to adjust the tire with respect to the wheel over a distance of approximately three times the length of the slots in each angle iron.

What is claimed as new is:

1. An adjustable tractor wheel comprising a wheel disk, a tire rim surrounding the wheel disk in spaced circumferential relation, a plurality of transverse angularly spaced inwardly extending flanges provided with longitudinal slots rigidly attached to the tire rim, an adjustable rim interposed between the wheel disk and the tire rim, a plurality of transverse angularly spaced outwardly extending flanges provided with longitudinal slots rigidly attached to the adjustable rim positioned for relative slidable movement with respect to said inwardly extending flanges on the tire rim, fastening means operatively interconnecting said inwardly and outwardly extending flanges for relative slidable movement, a plurality of transverse angularly spaced inwardly extending flanges provided with longitudinal slots rigidly attached to the adjustable rim, a plurality of spaced lugs rigidly attached to the wheel disk positioned for relative slidable movement with respect to said inwardly extending flanges on the adjustable rim, and fastening means operatively interconnecting the inwardly extending flanges of the adjustable rim and the lugs for relative slidable movement.

2. An adjustable tractor wheel comprising a wheel disk, a tire rim surrounding the wheel disk in spaced circumferential relation, an adjustable rim interposed between the wheel disk and the tire rim, a plurality of transverse angularly spaced flanges provided with longitudinal slots rigidly attached to the tire rim and adjustable rim in position to be connected together for relative slidable movement, fastening means operatively interconnecting said flanges for relative slidable movement, a plurality of transverse inwardly extending angularly spaced flanges provided with longitudinal slots rigidly attached to the adjustable rim, a plurality of lugs fastened to the periphery of the wheel disk and positioned for relative slidable movement with respect to the inwardly extending flanges of the adjustable rim, and fastening means operatively interconnecting said lugs and inwardly extending flanges for relative slidable movement.

3. A device in accordance with claim 2 in which the adjustable rim comprises a circular ring positioned concentrically with the wheel disk and the tire rim; and in which, the flanges are placed opposite one another in spaced radial angular relation about the outside and inside of the adjustable rim.

References Cited in the file of this patent

UNITED STATES PATENTS

| | | |
|---|---|---|
| 2,129,807 | Beckman et al. | Sept. 13, 1938 |
| 2,613,113 | Spurlin et al. | Oct. 7, 1952 |
| 2,682,430 | Brubaker | June 29, 1954 |

FOREIGN PATENTS

| | | |
|---|---|---|
| 563,508 | Great Britain | Aug. 17, 1944 |